(12) United States Patent
Guerrini et al.

(10) Patent No.: US 12,352,270 B2
(45) Date of Patent: Jul. 8, 2025

(54) FLUID CIRCULATOR FOR HEATING OR COOLING SYSTEMS

(71) Applicant: TACO ITALIA S.R.L., Sandrigo (IT)

(72) Inventors: Alessio Guerrini, Bassano del Grappa (IT); Daniele Sartor, San Martino di Lupari (IT)

(73) Assignee: TACO ITALIA S.R.L., Sandrigo (IT)

( * ) Notice: Subject to any disclaimer, the term of this patent is extended or adjusted under 35 U.S.C. 154(b) by 20 days.

(21) Appl. No.: 18/081,678

(22) Filed: Dec. 14, 2022

(65) Prior Publication Data

US 2023/0228272 A1 Jul. 20, 2023

(30) Foreign Application Priority Data

Dec. 14, 2021 (IT) ........................ 102021000031277

(51) Int. Cl.
| | |
|---|---|
| *F04D 13/06* | (2006.01) |
| *F04D 29/42* | (2006.01) |
| *H02K 3/02* | (2006.01) |
| *H02K 3/44* | (2006.01) |

(Continued)

(52) U.S. Cl.
CPC ..... *F04D 13/0693* (2013.01); *F04D 29/4286* (2013.01); *H02K 3/02* (2013.01); *H02K 3/44* (2013.01); *H02K 3/50* (2013.01); *H02K 5/225* (2013.01); *H02K 2203/06* (2013.01)

(58) Field of Classification Search
CPC .... F04D 13/0693; F04D 29/4286; F04D 1/00; F04D 13/064; F04D 29/026; F04D 29/628; F04D 13/06; F04D 25/06; H02K 1/146; H02K 5/128; H02K 5/225; H02K 7/14; H02K 3/50; H02K 3/02; H02K 3/30; H02K 3/38; H02K 3/44; H02K 2203/06; H02K 2203/09

See application file for complete search history.

(56) References Cited

U.S. PATENT DOCUMENTS

| | | | | |
|---|---|---|---|---|
| 5,515,606 A | * | 5/1996 | Albeck | .................. H05K 13/06 29/850 |
| 5,975,937 A | * | 11/1999 | Boischio | ................ H02K 5/225 439/404 |

(Continued)

FOREIGN PATENT DOCUMENTS

KR 20090026460 A * 3/2009

OTHER PUBLICATIONS

Anatomy of a Good Solderless Terminal Connection, Bob Nuckolls, Aero Electric Connection (Year: 1999).*

*Primary Examiner* — Dominick L Plakkoottam
(74) *Attorney, Agent, or Firm* — Loeb & Loeb LLP

(57) ABSTRACT

A related heating or cooling apparatus, namely a fluid circulator (100) for heating or cooling systems comprising: a body pump (1) having an impeller for moving the fluid; an electric motor (2) for rotating the impeller, the electric motor (2) comprising at least one electrical winding (21); at least one terminal (22) of an electrical power supply wiring of the electric motor (2); at least one electrical connection (5) between the terminal (22) and an end of the at least one electrical winding (21). The at least one electrical winding (21) is made of aluminum or alloys thereof, and the fluid circulator is provided with a protection element configured for sealingly enclosing the at least one electrical connection (5).

17 Claims, 3 Drawing Sheets

(51) Int. Cl.
*H02K 3/50* (2006.01)
*H02K 5/22* (2006.01)

(56) References Cited

U.S. PATENT DOCUMENTS

| | | | | |
|---|---|---|---|---|
| 6,124,655 | A * | 9/2000 | Jeske | H02K 5/225 |
| | | | | 310/71 |
| 7,479,047 | B2 * | 1/2009 | Boischio | H01R 13/113 |
| | | | | 310/71 |
| 2004/0140550 | A1 * | 7/2004 | Yoshida | H01P 1/047 |
| | | | | 257/E23.061 |
| 2009/0195955 | A1 * | 8/2009 | Hall | H02G 13/00 |
| | | | | 361/216 |
| 2010/0123363 | A1 * | 5/2010 | Poyner | A47L 15/4225 |
| | | | | 310/179 |
| 2012/0020820 | A1 * | 1/2012 | Francini | F04C 2/102 |
| | | | | 137/565.17 |
| 2012/0049669 | A1 * | 3/2012 | Garriga | H02K 9/12 |
| | | | | 310/59 |
| 2015/0171709 | A1 * | 6/2015 | Ito | H02K 5/225 |
| | | | | 310/52 |
| 2016/0248292 | A1 * | 8/2016 | Takarai | H05K 5/061 |
| 2017/0211530 | A1 * | 7/2017 | Fukuoka | F02M 37/103 |
| 2017/0317563 | A1 * | 11/2017 | Muraro | H02K 11/40 |

* cited by examiner (a)　　(b)　　(c)　　(d)

FLUID CIRCULATOR FOR HEATING OR COOLING SYSTEMS

TECHNICAL FIELD

The present invention relates to a fluid circulator, in particular to a fluid circulator for heating or cooling systems, and to a related heating or cooling apparatus incorporating at least one fluid circulator.

In general, the present invention finds application in the field of pumps for moving fluids, wherein an impeller is coupled to and set in motion by an electric motor.

PRIOR ART

Centrifugal electric pumps, generally known as "circulators", are used for the vector fluid circulation in the context of heating and/or cooling systems.

As known, a circulator generally comprises a synchronous electric motor, whose rotor is keyed on a shaft coupled to an impeller of a pump, which is therefore driven by the electric motor itself and which supplies head to the fluid. Known circulators may have different configurations for the impeller, based on the fluid handled and the head to be supplied. For instance, a known configuration provides for an impeller with curved blades, of the centrifugal type, however other configurations of impeller blades may be used.

Circulators are frequently used in heating and/or cooling systems, in particular within heating or cooling apparatuses, such as boilers, heat pumps or others, constituting the functional elements thereof.

A technical problem underlying the present invention is to provide a circulator in which it is possible to effectively adopt aluminum and alloys thereof for making the electrical windings of the electric motor.

Another purpose of the present invention is to provide a circulator with electric windings of aluminum and alloys thereof that are adapted to reliably operate in aggressive environments from an electrochemical point of view, for instance under humid and/or salinity conditions.

A further purpose of the present invention is to provide a circulator in which the electrical contact between aluminum wire of the winding and power supply terminal pin is ensured.

A further purpose of the present invention is to provide a circulator in which said electric contact is stable over time and during the service life of the circulator.

Indeed, said electrical contact between different materials (usually, aluminum and copper) is subject to redox problems, which degrade the electrical contact until it is reduced, thus reducing the service life of the circulator itself.

SUMMARY OF THE INVENTION

The solution idea underlying the present invention is to make a fluid circulator that overcomes the oxidation and redox problem of the electrical connection between aluminium wire of the winding and power supply terminal (usually made of copper), proposing not only electrical insulation but the overall protection of the surrounding area.

Based on this solution idea, the technical problem is solved by a fluid circulator for heating or cooling systems comprising a pump body having an impeller for fluid handling; an electric motor for rotating the impeller, the electric motor comprising at least one electrical winding; at least one terminal of an electric power supply wiring of the electric motor; at least one electrical connection between the terminal and an end of the at least one electrical winding. The at least one electrical winding is made of aluminium or alloys thereof, and a protection element configured to sealingly enclose the at least one electrical connection is provided.

Advantageously, in the fluid circulator aluminium and alloys thereof are effectively adopted for making the electrical windings of the electric motor.

Advantageously, the fluid circulator is reliably adapted to operate even in aggressive environments where the electrical connection, e.g., usually between Aluminum and Copper conductors, otherwise would be subject to deterioration.

Advantageously, in the fluid circulator good and durable electrical contact in the area of the electrical connection is ensured by the proper protection element.

Advantageously, in the fluid circulator there is an electrical connection stable over time, thus improving the duration of the service life of the circulator.

In short, the fluid circulator motor of this invention represents a technical solution having particular effectiveness for application or use in fluid circulators.

Preferably, the protection element adopted in the fluid circulator of this invention comprises an over-molding of plastic material applied to the at least one electrical connection. In particular, the manufacturing technique consists in injecting a plastic cover onto the terminal, eliminating the air around the components in the area of the electrical connection.

Preferably, the over-molding covers the at least one electrical connection and the possible interstices thereof, however leaving the other terminations visible and accessible for a PCB insertion.

In a preferred embodiment, the over-molding is made integrally with a further plastic portion of the electric motor, with the advantage of an integrated and more effective and efficient production, or manufacturing, process.

Further features and advantages will become clearer from the following detailed description of a preferred non-limiting embodiment of the present invention and from the dependent claims which depict preferred and particularly advantageous embodiments of the invention.

BRIEF DESCRIPTION OF THE DRAWINGS

The invention is illustrated with reference to the following figures, given by way of non-limiting example, in which.

In the several figures, analogous elements will be identified by analogous reference numbers.

DETAILED DESCRIPTION

Figure 1:
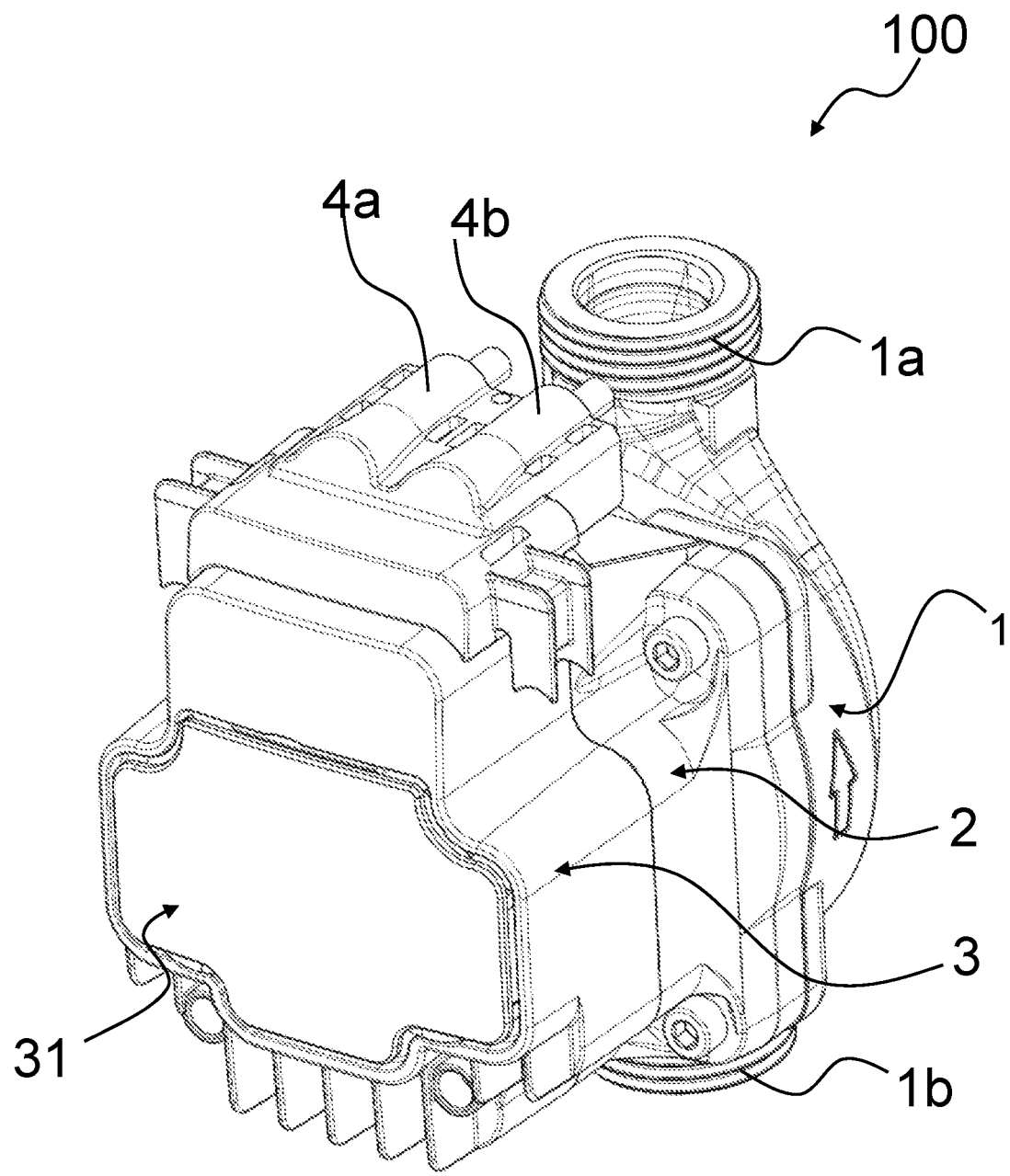
FIG. 1 shows a perspective view of a non-limiting example of fluid circulator.

FIG. 1 shows a perspective view of a fluid circulator 100 for heating or cooling systems, which represents a non-limiting example of the present invention. The fluid circulator 100 may also be defined as an electric pump, intended for fluid handling in heating and/or cooling systems.

In its general configuration, the circulator 100 comprises a pump body 1 and an electric motor 2, associated with each other to make the fluid handling.

The pump body 1 comprises an impeller (not visible) therein which is rotated by the electric motor 2. In general, the impeller is housed in a containment volute, which encloses it in the pump body 1 and inside which there is the fluid during the operation of the circulator.

The pump body 1 comprises an outlet connection 1a and an inlet connection 1b, for the fluid connection to a piping system, which the fluid circulator 100 is connected to and inside which the fluid to be handled flows. Both at the inlet and at the outlet, the connections 1a and 1b may be of the threaded flange or bayonet/plug type.

The electric motor 2, preferably of the synchronous type, may be understood essentially from the following components (not visible in FIG. 1): a permanent magnet rotor and a stator with the related electrical windings. The stator is preferably of the four stator-arm type, a configuration often used for two-phase electric motors, but other configurations may also be adoptable, for instance a three-phase electric motor configuration. The rotor is preferably housed within a protective sleeve that is integrally formed with a flange facing a wall of the volute in which the impeller rotates. The electric motor 2 further comprises a shaft (not visible) of the electric motor, to which the rotor is keyed and kinematically coupled.

The impeller, preferably of the centrifugal type, coupled to and rotated by the shaft, is adapted to impart a thrust to the fluid to provide a head or a pressure increase to the same.

In general, the electric motor 2 and the pump body 1 are separated from each other by a plurality of suitable sealed separating elements, so as to make a waterproof motor body and a watertight volute, thus avoiding fluid leakage.

The fluid circulator 100 further comprises a terminal box 3 associated with the electric motor 2. Said terminal box 3 is preferably positioned opposite the pump body 1.

The terminal box 3 comprises a closing and protection cap 31 for a control electronic card (not visible) of the fluid circulator 100.

The electronic card is arranged to control the operation of the fluid circulator 100, in particular to control the power supply of the electric motor 2.

The control electronic card is housed in a containment space defined and limited by the cap 31 when it is fitted and mounted on the terminal box 3.

The circulator 1 further comprises a plurality of connectors 4a and 4b of the electric or electronic type, which are connected to the electronic card contained in the terminal box 3.

Figure 2:
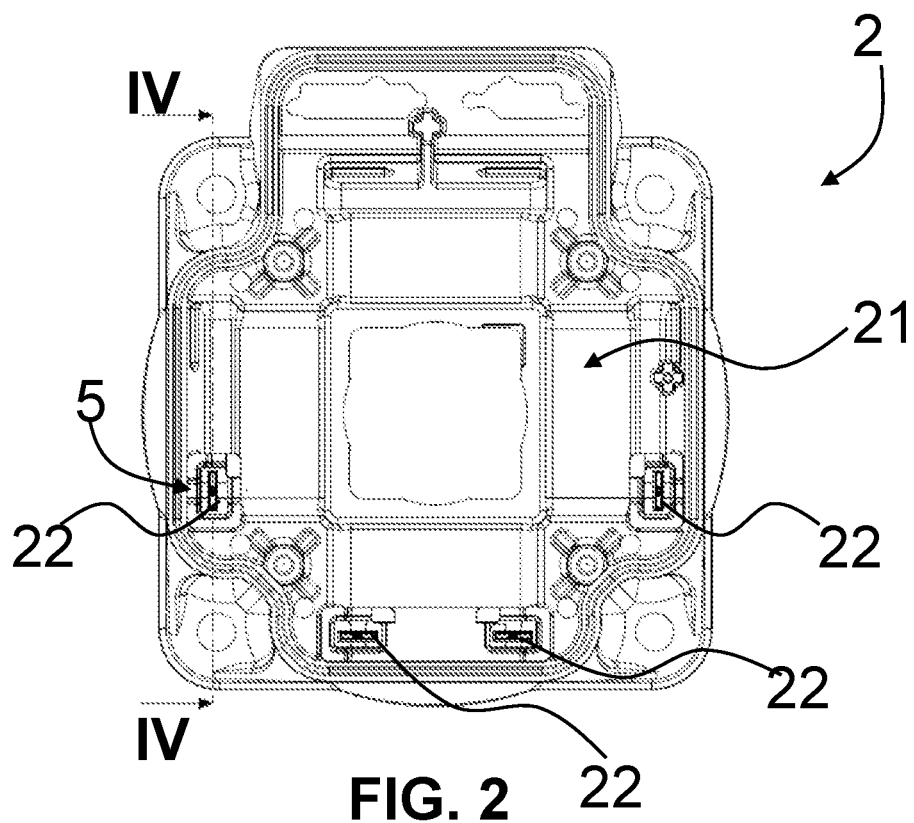
FIG. 2 shows a top view of an embodiment of an electric motor of a fluid circulator according to the present invention.

FIG. 2 shows a top view of a part of the electric motor 2. In this view, the stator of the electric motor is visible, but the rotor has been removed for ease of vision.

The electric motor 2 comprises at least one electric winding 21, which is not represented in its entirety showing each individual coil, for a graphical simplification.

In this example, the electric winding 21 is the one of the stator of the electric motor. The teachings of the present invention, in a variant, could be adopted in an electric winding of a rotor.

The fluid circulator 100 further comprises at least one terminal 22 of an electric power supply wiring of the electric motor 2, and at least one electric connection 5 between the terminal 22 and an end of the at least one electric winding 21.

Figure 3:
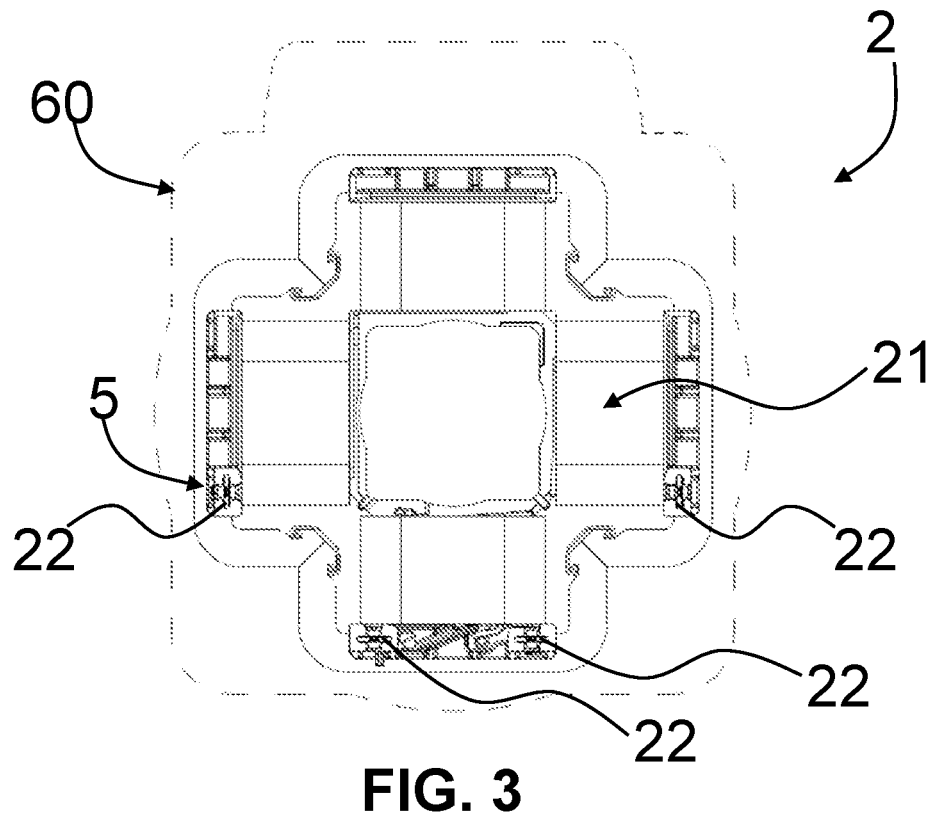
FIG. 3 exemplifies an over-molding of the electric motor of FIG. 2

FIG. 3 exemplifies an over-molding 60 of the electric motor 2, corresponding to a semi-finished product compared to what is shown in FIG. 2.

Indeed, the electric winding 21 of the electric motor 2 is made of aluminum or alloys thereof. The adoption of aluminum or alloys thereof for the electric winding 21 is mainly due to a reduction of the costs and/or to having an alternative material to use in case of a copper shortage, which the windings of electric motors are traditionally made of.

The aluminum, compared to copper, has a lower electrical conductivity therefore, despite the specific weight of aluminum being still lower, the volume required for a winding of the same power is higher. For this reason it is possible, in a non-limiting manner for the present solution, to keep a compact size of the fluid circulator 100 by appropriately limiting the power of the aluminum winding 21 and by filling all of the respective slots available in the electric motor 2. From an effectiveness point of view of the electric motor 2 with winding made of aluminum or alloys thereof, it is comparable with that of an electric motor with copper winding.

Figure 4:
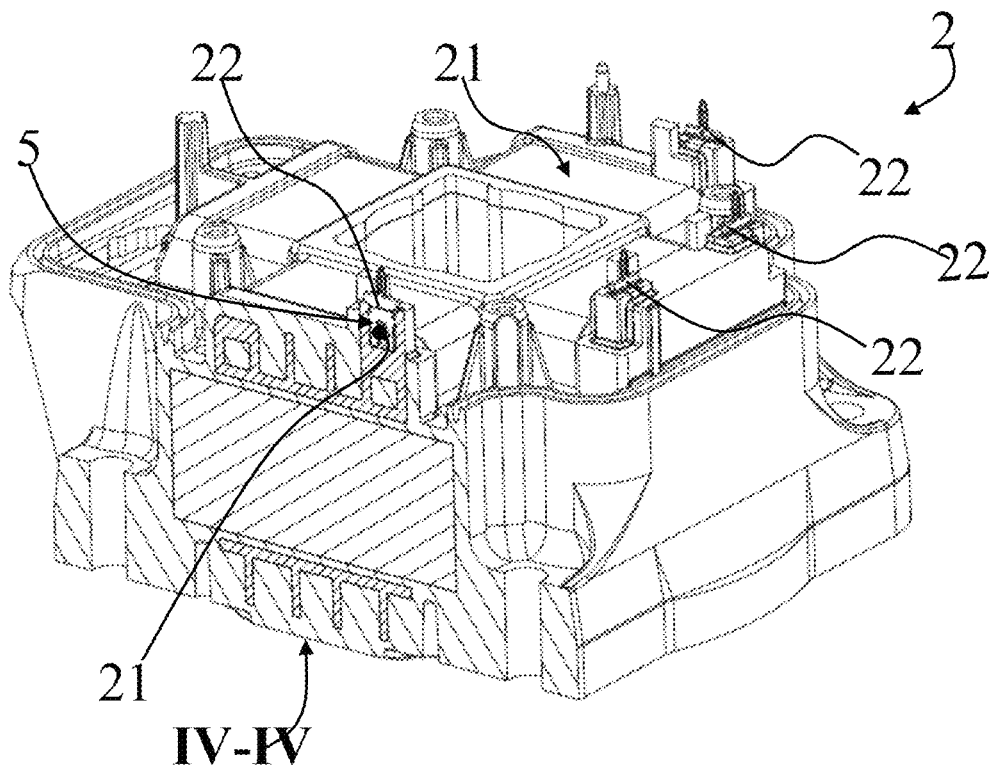
FIG. 4 shows a perspective view of the electric motor of FIG. 2, in which section IV-IV is visible.

As it will be detailed hereinafter, the important aspect in the fluid circulator 100 is to manage to ensure a contact between aluminum wire and electric terminal that is effective and stable over time. FIG. 4 shows a perspective view of the electric motor of FIG. 2, in which section IV-IV is visible, whereon one of the terminals 22 lies and in which the electric connection 5 between the terminal 22 and an end of the at least one electric winding 21 occurs.

To prevent oxidation of the at least one electric connection 5, the fluid circulator 100 comprises a protection element configured to sealingly enclose said at least one electric connection 5. In particular, the terminal 22 comprises a connecting element made of different material than the winding 21 (made of aluminum or alloys thereof), such as a connecting element 22 made of copper or alloys thereof, preferably coated with tin.

Preferably, the connecting element 22 is of the insulator-indentation type, as it will be further described. An insulator-indentation connector allows indenting the winding insulation and creating an electric contact without any type of welding or crimping of a third component. Preferably, the connecting element 22 is based on a spring principle being it a connector of elastic and resilient material adapted to couple with a respective element (in this case, the wire of the winding 21) and to maintain a stable electric contact exerting a positive mechanical contact force, even on elements of different diameters.

In an alternative embodiment, preferably usable for larger constructions of fluid circulators, the connecting element could be of the "faston" type. Still alternatively, the electric connection could directly provide for a mechanical crimping or welding, with the copper cable of the at least one terminal, namely without necessarily providing for a connecting element.

Figure 5:
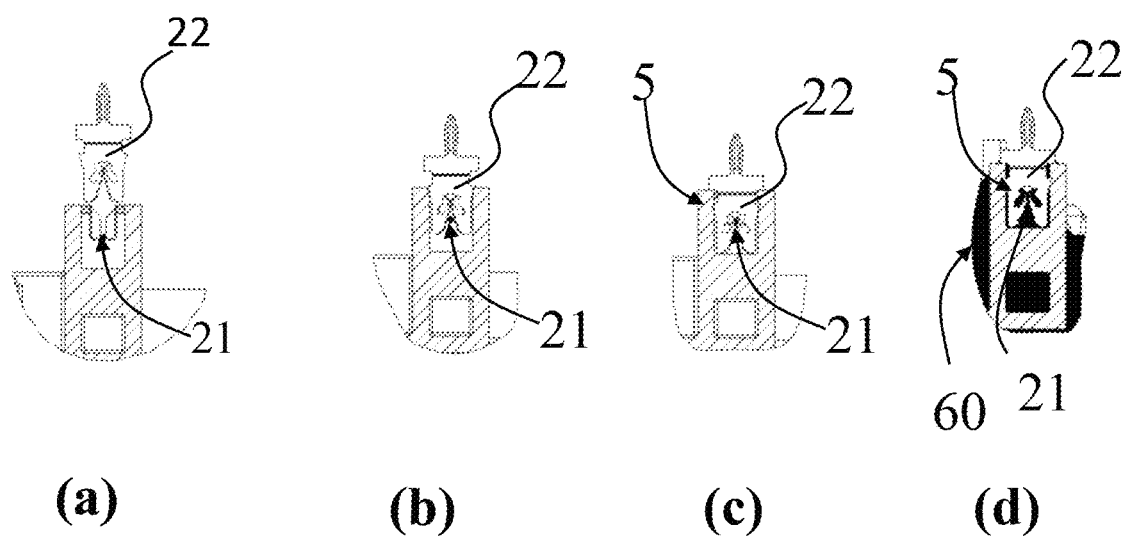
FIG. 5 shows an over-molding process of an electrical connection relating to section IV-IV.

FIG. 5 shows an over-molding process of an electric connection 5 relating to section IV-IV. With reference to sub-Figure (a), the connecting element 22 is inserted into the related slot in which the wire of the winding 21 of aluminum or alloys thereof is contained.

With reference to sub-Figure (b), the connecting element 22 comes into contact with the wire of the winding 21 of aluminum or alloys thereof.

With reference to sub-Figure (c), the connecting element 22 of the insulator-indentation type exerts a positive mechanical contact force thus making the electric connection 5.

With reference to sub-Figure (d), the protection element 60, which is configured to sealingly enclose the electric connection 5, is made. In this example, the protection element comprises an over-molding 60 of plastic material, already schematized in its entirety in FIG. 3. As visible, the over-molding 60 is applied to the electric connection 5, covering it and also covering any interstices, for a maximum protection and seal of the area. As mentioned, the over-molding 60 is integrally made with a further plastic portion of the electric motor 2.

In an alternative embodiment, the protection element could comprise a protective coating, such as a resin or a gel (for instance silicone based) or a paint, applied to an area of the at least one electric connection 5. This alternative solution prevents the oxidation of the area.

Still in an alternative embodiment, the protection element could comprise at least one cap element, adapted to respectively seal the electric connection 5. This alternative solution constitutes a limited protection to the area of the electrical terminal. For instance, the cap element could be fixed by interference or by welding (ultrasonic welding for instance).

In general, the protection element is adapted to eliminate the exposure of aluminum wire and terminal, e.g., of copper, to oxygen, to limit the oxidation of the pieces, so as to not compromise the reliability of the electrical connection over time.

Even though not represented in the figures, the present invention also provides for a related heating or cooling apparatus comprising at least one fluid circulator 100. The heating apparatus may be for instance a boiler or a heat pump, or in general a heat generating device for systems. The cooling apparatus may be for instance an underfloor conditioning or cooling system. The heating or cooling apparatus is a technical solution having particular effectiveness of use, incorporating the at least one circulator 100 whose electric connection with the winding of aluminum or alloys thereof is protected by the protection element adopted thanks to the teachings of the present invention.

Considering the herein reported description, the person skilled in the art may conceive further changes and variants, in order to meet contingent and specific needs.

The embodiments herein described are therefore to be intended as illustrative and non-limiting examples of the invention.

The invention claimed is:

1. A fluid circulator for heating or cooling systems, the fluid circulator comprising:
   a pump body having a centrifugal impeller configured for moving fluid, the pump body including an inlet connection and an outlet connection disposed opposite one another and configured to be connected to a piping system for a heating or cooling system to form a fluid communication between the piping system and the impeller, the inlet connection configured to communicate the fluid from the piping system toward the centrifugal impeller and the outlet connection configured to communicate the fluid from the centrifugal impeller to the piping system;
   an electric motor comprising at least one electrical winding and being configured to rotate the centrifugal impeller, wherein the pump body is disposed adjacent a first end of the electric motor;
   a terminal box disposed adjacent a second end of the electric motor opposite the first end, the terminal box including an electronic control card configured to control an electric power supply of the electric motor;
   at least one terminal of the electric power supply wiring of the electric motor, each terminal of the at least one terminal including a connecting element in contact with the at least one electrical winding of the electric motor so as to form at least one electrical connection between the connecting element and the at least one winding; and
   a protection element sealingly enclosing the at least one electrical connection, the protection element comprising an overmolding of plastic material integrally made with a portion of the electric motor;
   wherein the at least one electrical winding is made of aluminum or aluminum alloys and the connecting element of each terminal of the at least one terminal is made from a material that is not aluminum or aluminum alloys.

2. The fluid circulator according to claim 1, wherein the connecting element is made of copper or a copper alloy.

3. The fluid circulator according to claim 2, wherein the connecting element is further coated with tin.

4. The fluid circulator according to claim 1, wherein the connecting element is an insulator-indentation type connecting element.

5. The fluid circulator according to claim 1, wherein the electrical connection is formed by at least one of a mechanical crimping or a welding with the at least one terminal.

6. The fluid circulator according to claim 1, wherein the protection element is configured to prevent an oxidation of the at least one electrical connection.

7. The fluid circulator according to claim 1, wherein the protection element comprises a protective coating applied to an area of the at least one electrical connection.

8. The fluid circulator according to claim 7, wherein the protective coating comprises at least one of a resin, a gel, or a paint.

9. The fluid circulator according to claim 1, wherein the protection element comprises at least one cap element adapted to respectively seal the at least one electrical connection.

10. The fluid circulator according to claim 1, wherein the at least one electrical winding is of a stator of the electric motor.

11. The fluid circulator according to claim 1, wherein the overmolding of plastic material covers the at least one electrical connection and interstices thereof.

12. The fluid circulator according to claim 1, wherein each terminal of the at least one terminal further comprises a slot configured to receive the connecting element, and wherein the at least one electrical winding is disposed within the slot such that the connecting element contacts the at least one electrical winding when the connecting element is received within the slot.

13. A heating or cooling apparatus comprising a fluid circulator, the fluid circulator comprising:
   a pump body having a centrifugal impeller for moving fluid, the pump body including an inlet connection and an outlet connection disposed opposite one another and configured to connect to a piping system for a heating or cooling system to form a fluid communication between the piping system and the impeller, the inlet connection configured to communicate the fluid from the piping system toward the centrifugal impeller and the outlet connection configured to communicate the fluid from the centrifugal impeller to the piping system;

an electric motor comprising at least one electrical winding and being configured to rotate the centrifugal impeller, wherein the pump body is disposed adjacent a first end of the electric motor;

a terminal box disposed adjacent a second end of the electric motor opposite the first end, the terminal box including an electronic control card configured to control an electric power supply of the electric motor;

at least one terminal of the electrical power supply wiring to the electric motor, each terminal of the at least one terminal including a connecting element in contact with the at least one electrical winding of the electric motor so as to form at least one electrical connection between the connecting element and the at least one winding; and a protection element sealingly enclosing the at least one electrical connection, the protection element comprising an overmolding of plastic material integrally made with a portion of the electric motor;

wherein the at least one electrical winding is made of aluminum or aluminum alloys.

14. The fluid circulator of claim 13, wherein each terminal of the at least one terminal further comprises a slot configured to receive the connecting element, and wherein the at least one electrical winding is disposed within the slot.

15. The fluid circulator of claim 14, wherein the connecting element contacts the at least one electrical winding when the connecting element is received within the slot.

16. The fluid circulator of claim 13, wherein the connecting element of each terminal of the at least one terminal is made from a material that is not aluminum or aluminum alloys.

17. The fluid circulator according to claim 13, wherein the overmolding of plastic material covers the at least one electrical connection and interstices thereof.

* * * * *